United States Patent [19]

Yen

[11] 3,999,434
[45] Dec. 28, 1976

[54] TEMPERATURE PROBE ASSEMBLY AND PROBE COVER RETAINER

[75] Inventor: David H. Yen, Sunnyvale, Calif.
[73] Assignee: Filac Corporation, Sunnyvale, Calif.
[22] Filed: Jan. 9, 1975
[21] Appl. No.: 539,798

[52] U.S. Cl. .................. 73/343 R; 73/362 AR; 338/28
[51] Int. Cl.² .................................. G01K 1/08
[58] Field of Search ............ 73/343 R, 362 AR; 338/28; 206/306; 136/221, 230

[56] References Cited
UNITED STATES PATENTS

| | | | |
|---|---|---|---|
| 3,500,280 | 3/1970 | Ensign | 73/362 AR |
| 3,650,153 | 3/1972 | Schwab | 73/362 AR |
| 3,729,998 | 5/1973 | Mueller | 73/362 AR |
| 3,738,479 | 6/1973 | Sato | 73/362 AR |
| 3,822,593 | 7/1974 | Oudewaal | 73/362 AR |

Primary Examiner—Donald O. Woodiel
Assistant Examiner—Denis E. Corr

[57] ABSTRACT

A temperature probe assembly including a housing with the temperature probe extending from one end with said end including means for retaining a probe cover. A probe cover ejector extends from the other end of the housing. Spring means within the housing serving to urge said probe and ejector in outwardly extended positions relative to said housing whereby said probe is urged into intimate contact with a probe cover and said ejector is urged in a retracted position. When the ejector is moved into said housing, it extends from the other end to release the retained cover.

5 Claims, 4 Drawing Figures

U.S. Patent  Dec. 28, 1976  Sheet 1 of 2  3,999,434
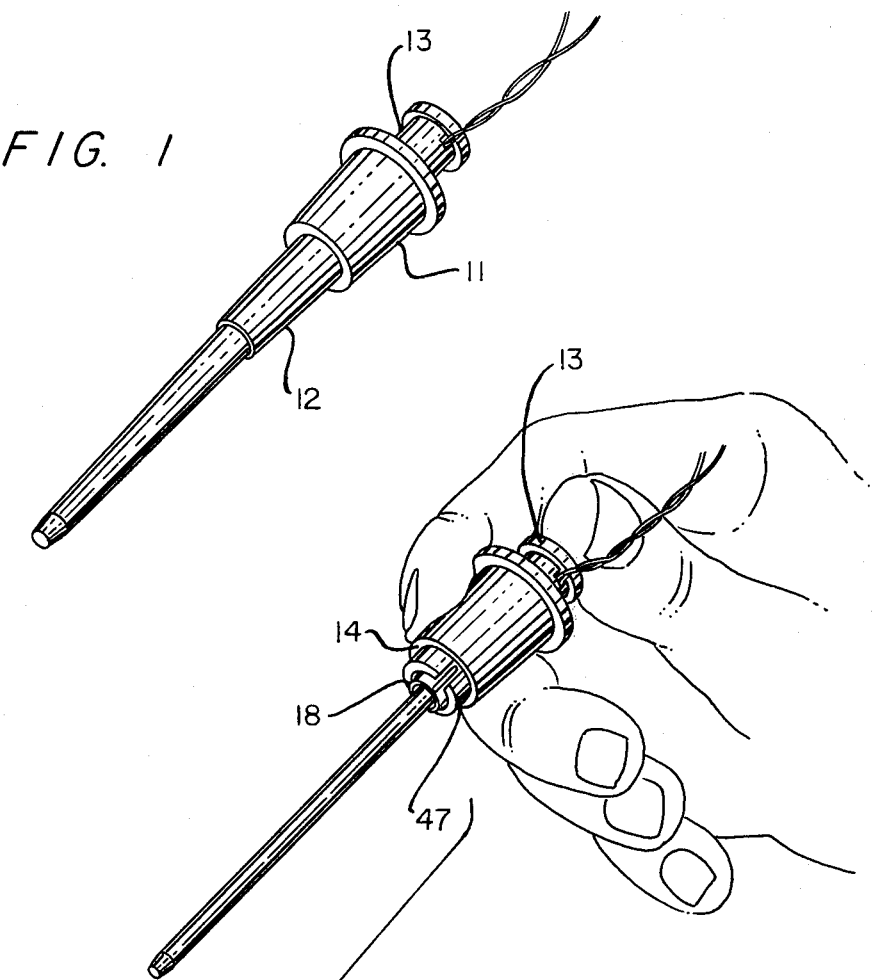
FIG. 1
FIG. 2
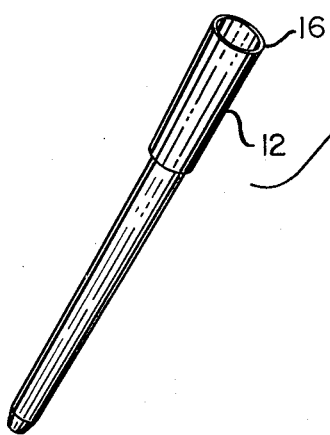

TEMPERATURE PROBE ASSEMBLY AND PROBE COVER RETAINER

BACKGROUND OF THE INVENTION

The invention relates generally to a temperature probe assembly and probe cover retainer.

In the medical arts it is common to measure body temperature. A long established method of measuring temperature has been by means of a glass bulb thermometer wherein a fluid is caused to expand into a calibrated column in response to temperature. The thermometer must be in contact with the patient for a relatively long period of time to permit heat transfer to the liquid. After each reading, the thermometer is sterilized to prevent transfer of contagious diseases from one patient to the next. To eliminate sterilization, there have been provided disposable covers or sheaths into which the thermometer is placed and which are disposed after each measurement.

With the advent of electronics there have been developed probes with elements which change electrical characteristics, such as resistance, with temperature. These probes are associated with electronic circuits which provide a temperature indication in the form of a meter reading or a digital display. These probes have generally been used with disposable sheaths or covers. One type of cover has been in the form of an elongated tube closed at one end and adapted to receive the temperature probe with its temperature sensitive end in contact with the closed end of the tube. The end of the tube is either relatively thin or metallic to provide good heat transfer for rapid response.

There have also been developed probe assemblies which permit easy engagement of the probe cover and disposal thereof after a temperature measurement has been obtained without the necessity of touching or holding the cover.

OBJECTS AND SUMMARY OF THE INVENTION

It is a general object of the present invention to provide an improved temperature probe assembly.

It is another object of the present invention to provide a probe assembly which securely engages and holds a probe cover in intimate contact with the temperature sensitive end of the probe.

It is another object of the present invention to provide a probe assembly which securely engages and retains a probe cover in intimate contact with the sensing tip and which includes means for readily releasing the probe cover for disposal.

It is another object of the present invention to provide a probe cover holder which is simple in construction and inexpensive to manufacture.

These and other objects of the invention are achieved by a probe holder which includes a housing with a temperature probe extending from one end and including means for receiving and retaining a probe cover at said one end with a probe cover ejector extending from the other end together with spring means for urging said probe and probe ejector in extended positions relative to said housing whereby said probe is urged against a probe cover and said probe ejector is urged in a retracted position from which it may be urged into said housing to extend from the other end of said housing to release the probe cover.

BRIEF DESCRIPTION OF THE DRAWINGS

FIG. 1 is a perspective view of a temperature probe assembly and probe cover retainer with a retaining probe cover.

FIG. 2 is a perspective view showing the temperature probe assembly and probe cover retainer with the cover released.

DESCRIPTION OF PREFERRED EMBODIMENT

Figure 3:
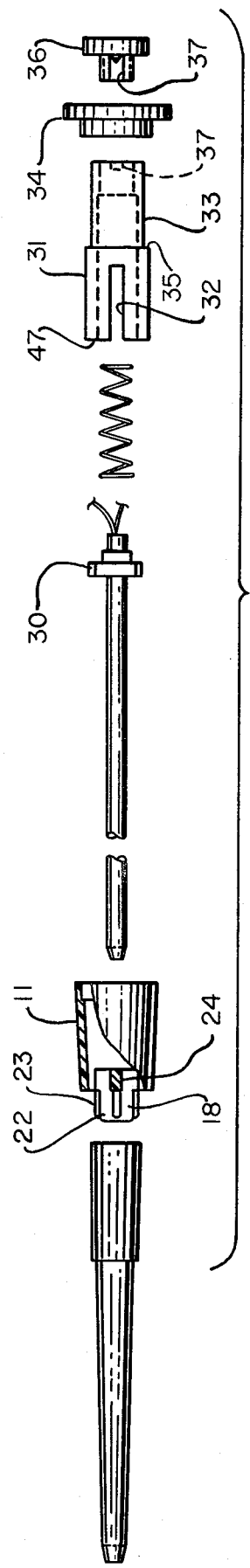
FIG. 3 is an exploded view of the temperature probe assembly and probe cover retainer and probe cover.

Referring generally to FIGS. 1 and 2, there is shown a temperature probe assembly and probe cover retainer with a probe cover. The assembly includes a housing 11 which is adapted to receive and retain the probe cover 12 at one end and has projecting from the other end one end of probe cover ejector 13. When the probe cover ejector 13 moves into the housing, the other end extends beyond the end 14 of the housing and abuts the end 16 of the probe cover to release the probe cover from the probe cover retainer 17 extending beyond the end of the housing.

Figure 4:
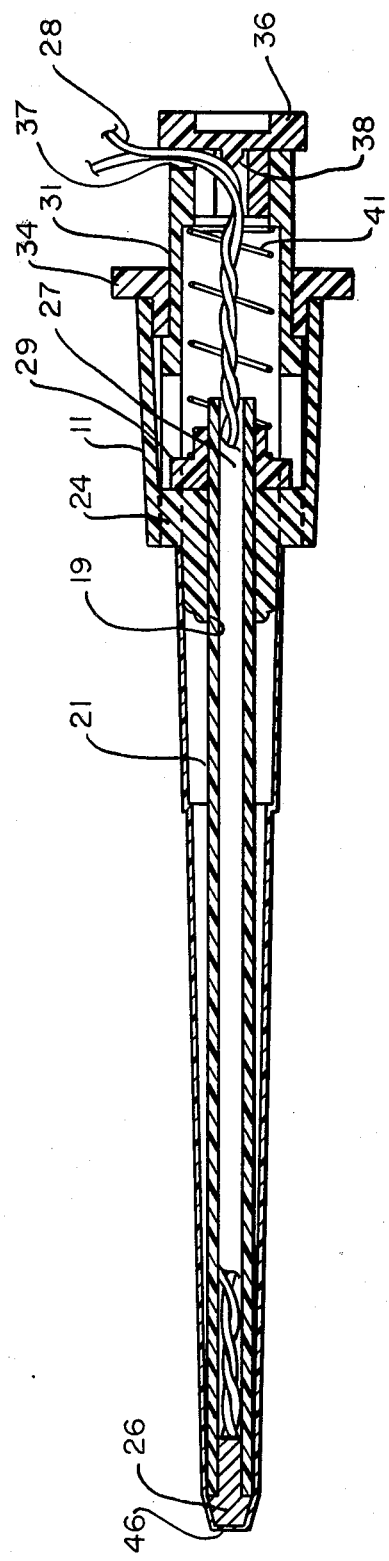
FIG. 4 is a sectional view of the temperature probe assembly and probe cover retainer with a probe cover.

Referring now more particularly to FIGS. 3 and 4, the housing 11 includes a probe guide and cover retainer 18 which is axially disposed with respect to the housing. The guide and retainer 18 includes an axial bore 19 adapted to slidably receive the probe 21. The guide and retainer 18 includes portion 22 which extends beyond the end of the housing and which is provided with a plurality of ribs 23 which are adapted to receive the adjacent end of the probe cover and retain the same. The guide and retainer 18 is held within the housing by means of a plurality of radially extending ribs 24 which maintain the guide and retainer 18 axial relative to the housing. The probe 21 includes a sensitive end 26 and a remote end 27 from which electrical leads 28 which cooperate with the sensing element disposed at the end 26 extend. The remote end includes a collar 29 which is adapted to limit axial movement of the probe outwardly of the housing.

A cylindrical cover ejector 31 is disposed within the housing and includes spaced longitudinal slots 32, one for each rib 24 whereby the ejector may be urged into the housing with one end extending beyond the end of the housing to abut and release the cover as previously described. The collar 29 may include projections 30 adapted to fit within the slots 32 to prevent rotation of the probe. The other end of the ejector is of reduced diameter, as shown at 33, and is engaged by a collar 34 suitably secured to the housing whereby to guide the ejector for axial movement. The shoulder 35 limits outward movement of the ejector to retain it in the housing. A cap 36 is adapted to be secured to the end of the ejector. The cap and ejector are provided with cooperating slots 37 which provide an opening for egress of the leads 28. Nipple 38 engages and secures the leads. A spring 41 is disposed in the housing with one end adapted to engage the collar 29 and the other end adapted to engage the ejector 13 serving to urge the ejector and probe outwardly from the housing.

The probe cover is selected to have a length which is less than the length of the probe whereby as it is seated on the ribs for retention, it urges the probe into the housing against the spring whereby the sensitive probe end 26 is urged against the end of the housing 46 to assure good heat transfer.

To dispose of the probe cover, the ejector 13 is moved into the housing by means of button 36 whereby the end 47 extends from the housing as shown more clearly in FIG. 2 to abut the end 16 of the cover and release the cover from the holder.

Referring to FIG. 2, it is seen that the probe assembly can be held and operated with one hand with the thumb engaging the button 36 and two fingers engaging the housing whereby the thumb can move toward the housing to eject or release a cover. The probe can then be inserted into a cover 12 which then seats upon the ribs 24 permitting the next temperature measurement. Furthermore, the probe assembly and probe cover retainer provides for intimate seating of the cover on the probe to provide for good heat transfer, is simple in construction and easy to operate.

What is claimed is:

1. A temperature probe assembly including a housing, a temperature probe having a remote end extending into one end of said housing and a sensitive end extending from said one end of said housing, said one end of said housing including means for retaining a probe cover, a probe cover ejector slidably carried in said housing with one end extending from the other end of said housing, spring means within said housing engaging the remote end of said probe and said probe cover ejector to urge the probe and ejector outwardly from opposite ends of said housing whereby said probe is urged against a probe cover when a cover is inserted thereon and whereby said ejector is urged into a retracted position from which it may be depressed, whereby when the ejector is depressed the other end of the ejector extends from said one end of the housing over said probe cover retaining means to abut a retained cover and urge it off of the probe cover retaining means to release the cover.

2. A temperature probe assembly and probe cover retainer comprising elongated temperature sensing probe having a sensitive end and a remote end, a housing having one end including means for receiving the remote end of said probe with the sensing end extending outwardly from said one end of said housing, means at said one end of said housing for receiving and retaining a probe cover, a probe cover ejector mounted for axial movement within said housing having an end extending from the other end of said housing, and spring means disposed in said housing engaging said probe cover ejector and the remote end of the probe to urge the both of the same outwardly of said housing whereby the probe is urged outwardly with its sensitive end against a probe cover inserted on the probe and said ejector is urged outwardly from the other end of said housing, said probe cover ejector including end means adapted to extend from said housing over the probe cover receiving and retaining means, whereby when the end of the probe cover ejector is depressed the end means abuts the probe cover to urge it off of the receiving and retaining means and release the probe cover.

3. A temperature probe sensing assembly and probe cover retainer comprising an elongated temperature sensing probe having a temperature sensing end and a remote end, a cylindrical housing, said housing including a probe receiving sleeve and cover retainer at one end with the retainer extending outwardly from said housing, a probe collar mounted on the remote end of said probe to limit outward movement of said probe along the axis of said housing, a probe cover ejector mounted in said housing for axial movement relative thereto, said ejector including an ejection end adapted to extend over said probe cover retainer to release a probe cover from the assembly and one end extending beyond the other end of said housing, and spring means for urging said probe ejector and probe axially outwardly from said housing whereby the temperature sensing end of the probe intimately contacts the end of said cover carried by the probe assembly and the ejector is maintained in its retracted position from which it is moved inwardly into the housing so that the ejection end abuts and releases a probe cover carried by the cover retainer.

4. A temperature sensing assembly and probe cover retainer as in claim 3 wherein said probe receiving sleeve and cover retainer are mounted in said one end of said housing by radially extending ribs and said one end of said ejector includes slots adapted to straddle said ribs during movement of said ejector to release a retained cover.

5. A temperature sensing assembly and probe cover retainer as in claim 4 in which said probe cover includes projections adapted to engage said slots to prevent rotation of said probe.

* * * * *